United States Patent
Kawai

(10) Patent No.: US 10,175,710 B2
(45) Date of Patent: Jan. 8, 2019

(54) POWER DEMAND CONTROL DEVICE, POWER DEMAND CONTROL METHOD, POWER DEMAND CONTROL SYSTEM, AND RECORDING MEDIUM

(71) Applicant: OMRON CORPORATION, Kyoto-shi, Kyoto (JP)

(72) Inventor: Wakahiro Kawai, Konan (JP)

(73) Assignee: OMRON CORPORATION, Kyoto-shi (JP)

( * ) Notice: Subject to any disclaimer, the term of this patent is extended or adjusted under 35 U.S.C. 154(b) by 190 days.

(21) Appl. No.: 15/122,293

(22) PCT Filed: Feb. 4, 2015

(86) PCT No.: PCT/JP2015/053115
§ 371 (c)(1),
(2) Date: Aug. 29, 2016

(87) PCT Pub. No.: WO2015/133215
PCT Pub. Date: Sep. 11, 2015

(65) Prior Publication Data
US 2016/0370817 A1     Dec. 22, 2016

(30) Foreign Application Priority Data

Mar. 5, 2014 (JP) ................................. 2014-043137

(51) Int. Cl.
*G05F 1/66* (2006.01)
*H02J 3/00* (2006.01)
(Continued)

(52) U.S. Cl.
CPC ............ *G05F 1/66* (2013.01); *G05B 19/042* (2013.01); *H02J 3/00* (2013.01); *H02J 3/14* (2013.01);
(Continued)

(58) Field of Classification Search
CPC ........................................................ G05F 1/66
(Continued)

(56) References Cited

U.S. PATENT DOCUMENTS 4,141,069 A * 2/1979 Fox ........................... H02J 3/14
307/52
4,347,575 A * 8/1982 Gurr .................... H02J 13/0086
307/35
(Continued)

FOREIGN PATENT DOCUMENTS

CN           85108055 A     7/1986
CN           1618157 A      5/2005
(Continued)

OTHER PUBLICATIONS

Gyugyi, Laszlo, et al. "The unified power flow controller: A new approach to power transmission control." IEEE Transactions on power delivery 10.2 (1995): pp. 1085-1097.*
(Continued)

*Primary Examiner* — Satish Rampuria
(74) *Attorney, Agent, or Firm* — Metrolexis Law Group, PLLC

(57) ABSTRACT

An electric power demand control system selects a presswork device as a target of electric power demand control in a case where the ratio of the total time length of a non-working state of the presswork device within a time period to the total time length of a working state of the presswork device within the time period is larger than a threshold. This makes it possible to alleviate, for example, (i) a decrease in production efficiency caused by electric power demand control at a facility at which production lines are installed and (ii) environmental deterioration due to electric power demand control.

14 Claims, 5 Drawing Sheets

(51) Int. Cl.
*H02J 3/14* (2006.01)
*G05B 19/042* (2006.01)

(52) U.S. Cl.
CPC . *G05B 2219/39407* (2013.01); *Y02B 70/3225* (2013.01); *Y02P 80/11* (2015.11); *Y02P 80/114* (2015.11); *Y04S 20/222* (2013.01)

(58) Field of Classification Search
USPC ................................................ 700/275–306
See application file for complete search history.

(56) References Cited

U.S. PATENT DOCUMENTS

| | | |
|---|---|---|
| 2003/0011460 A1 | 1/2003 | Ying |
| 2003/0011486 A1 | 1/2003 | Ying |
| 2003/0020333 A1 | 1/2003 | Ying |
| 2007/0100479 A1* | 5/2007 | Ahmed ............... G05B 15/02 700/47 |
| 2011/0040418 A1* | 2/2011 | Kalen .................. F03D 9/007 700/291 |
| 2012/0123609 A1* | 5/2012 | Kuo ..................... H05B 1/0263 700/300 |
| 2012/0191414 A1 | 7/2012 | Takiguchi et al. |
| 2012/0303171 A1* | 11/2012 | Barrett ............. H04W 52/0264 700/295 |
| 2013/0331959 A1 | 12/2013 | Kawai |
| 2014/0074307 A1 | 3/2014 | Matsuyama et al. |
| 2014/0222230 A1 | 8/2014 | Shimizu et al. |

FOREIGN PATENT DOCUMENTS

| | | | |
|---|---|---|---|
| CN | 102483623 | A | 5/2012 |
| EP | 2166636 | A2 | 3/2010 |
| JP | H09-252533 | A | 9/1997 |
| JP | H11-215700 | A | 8/1999 |
| JP | 2002-139283 | A | 5/2002 |
| JP | 2005-333693 | A | 12/2005 |
| JP | 2009-240054 | A | 10/2009 |
| JP | 2010-088192 | A | 4/2010 |
| JP | 2010-240915 | A | 10/2010 |
| JP | 2012-255567 | A | 12/2012 |
| JP | 2013-027211 | A | 2/2013 |
| JP | 2013-247769 | A | 12/2013 |
| TW | 201243528 | A1 | 11/2012 |
| TW | 201319972 | A1 | 5/2013 |
| WO | 2013-080619 | A1 | 6/2013 |

OTHER PUBLICATIONS

Vu, H., et al. "An improved voltage control on large-scale power system." IEEE transactions on power systems 11.3 (1996): pp. 1295-1303.*

Edris, A., et al. "Controlling the flow of real and reactive power." IEEE Computer Applications in power 11.1 (1998): pp. 20-25.*

The Chinese Office Action dated Jan. 8, 2018 in a counterpart Chinese patent application.

The English translation of the international preliminary report on patentability (Chapter I) of PCT/JP2015/053115 mailed by the International Bureau of WIPO dated Sep. 15, 2016.

The extended European search report (EESR) dated Oct. 2, 2017 in a counterpart European patent application.

The Taiwan office action letter dated Jan. 12, 2016 in the counterpart Taiwanese patent application.

The International Search Report of PCT/JP2015/053115 dated Apr. 7, 2015.

* cited by examiner

POWER DEMAND CONTROL DEVICE, POWER DEMAND CONTROL METHOD, POWER DEMAND CONTROL SYSTEM, AND RECORDING MEDIUM

TECHNICAL FIELD

The present invention relates to an electric power demand control device, an electric power demand control method, an electric power demand control system, a program, and a recording medium for controlling electric power demand at a facility such as a factory.

BACKGROUND ART

Various facilities requiring large amounts of electric power (for example, a factory that uses high-voltage electric power or an office building) each hold a contract with an electric power supplier with an electric power basic charge based on the maximum amount of electric power usable by the facility. This maximum amount usable is typically called demand-contract electric power. An electric power basic charge based on demand-contract electric power applies unless electric power consumed by the facility exceeds the contract value. If electric power consumption exceeds demand-contract electric power for even 30 minutes or so, the basic charge for the subsequent months is greatly increased.

Under such circumstances, there have been proposed various techniques for monitoring electric power consumption or reducing an electric power demand amount in order to prevent electric power consumption from exceeding demand-contract electric power. In view of the circumstances of electric power supply in recent years, there have also been proposed (i) increasing an electric power charge for a time frame in which the demand for electric power is intense (demand response) or (ii) providing a monetary value to an electric power reduction capability at a facility (negawatt transaction). This has led to growing expectations for a technique for automatically controlling electric power demand at a facility.

Patent Literatures 1 and 2 each disclose, as a technique for automatically controlling electric power demand, a conventional technique of, in a case where it is predicted that the electric power consumption amount will exceed demand-contract electric power, stopping air-conditioning installations in such a manner that stoppable air-conditioning installations are stopped first. Further, Patent Literature 3 proposes a technique of forcibly controlling an illumination device with relatively large electric power consumption to reduce electric power consumption at the entire facility.

There have also been proposed techniques for performing demand control for (i) a production device at a facility such as a factory or (ii) a storage container such as a freezer at a supermarket. Patent Literature 4, for example, discloses a technique of limiting the timing of a shift of a production device from a standby state to a working state to reduce an increase in electric power consumption. Patent Literature 5 discloses a technique of selecting a controllable device from among a plurality of production devices to reduce electric power use. Patent Literature 6 discloses a technique of substantially forcibly switching the operation of a device to an electric power saving state.

CITATION LIST

Patent Literature

[Patent Literature 1]
 Japanese Patent Application Publication, Tokukai, No. 2012-255567 A (Publication Date: Dec. 27, 2012)
[Patent Literature 2]
 Japanese Patent Application Publication, Tokukai, No. 2002-139283 A (Publication Date: May 17, 2002)
[Patent Literature 3]
 Japanese Patent Application Publication, Tokukai, No. 2009-240054 A (Publication Date: Oct. 15, 2009)
[Patent Literature 4]
 Japanese Patent Application Publication, Tokukai, No. 2005-333693 A (Publication Date: Dec. 2, 2005)
[Patent Literature 5]
 Japanese Patent Application Publication, Tokukai, No. 2010-240915 A (Publication Date: Oct. 28, 2010)
[Patent Literature 6]
 Japanese Patent Application Publication, Tokukai, No. 2013-247769 A (Publication Date: Dec. 9, 2013)

SUMMARY OF INVENTION

Technical Problem

The above conventional techniques are unfortunately problematic in that electric power demand control causes a decrease in production efficiency at the facility or causes environmental deterioration.

If, for instance, a device for maintaining a facility environment such as an air conditioner or lighting device is controlled forcibly, it may not be possible to maintain a comfortable working environment or ensure safety and sanitation in the facility. If a target of electric power demand control is selected on the basis of the amount of electric power use or the rate of increase in electric power use, electric power consumption will change depending on the production condition, problematically making it impossible to set a general selection criterion. Further, if a technique is used that selects a device that has been continuously in operation for an extended time period or that presets a controllable device, that technique will not allow the timely operation state of a device to be considered in selecting a device as a target of electric power demand control. This indicates that such a technique may let electric power demand control be performed for a device with a high operation rate to unfortunately decrease the production efficiency greatly. This in turn problematically decreases the production yield or impairs the quality of articles in storage.

The present invention has been accomplished to solve the above problems. It is an object of the present invention to provide an electric power demand control device, an electric power demand control method, an electric power demand control system, a program, and a recording medium each of which can alleviate, for example, (i) a decrease in production efficiency caused by electric power demand control at a facility at which production lines are installed and (ii) environmental deterioration due to electric power demand control.

Solution to Problem

In order to solve the above problems, an electric power demand control device in accordance with the present invention is an electric power demand control device, including:

a calculating section configured to calculate (i) a total time length of a working state of a device within a time period and (ii) a total time length of a non-working state of the device within the time period; a determining section configured to determine, on a basis of a ratio of the total time length of the non-working state to the total time length of the working state, whether to select the device as a target of electric power demand control; and an instructing section configured to, in a case where the determining section has determined to select the device as the target of the electric power demand control, instruct the device to shift to the non-working state.

The above configuration makes it possible to decide, in view of the timely operation state of a device within a time period, whether to select that device as a target of electric power demand control. This allows (i) a device that does not operate much to be a target of electric power demand control and/or (ii) a device that operates sufficiently to stop being a target of electric power demand control. The above configuration thus makes it possible to advantageously alleviate, for example, (i) a decrease in production efficiency caused by electric power demand control at a facility at which production lines are installed and (ii) environmental deterioration due to electric power demand control.

In order to solve the above problems, an electric power demand control method in accordance with the present invention is an electric power demand control method, including the steps of: (a) calculating (i) a total time length of a working state of a device within a time period and (ii) a total time length of a non-working state of the device within the time period; (b) determining, on a basis of a ratio of the total time length of the non-working state to the total time length of the working state, whether to select the device as a target of electric power demand control; and (c) in a case where the step (b) has determined to select the device as the target of the electric power demand control, instructing the device to shift to the non-working state.

The above configuration makes it possible to produce working effects similar to those produced by the electric power demand control device in accordance with the present invention.

The electric power demand control device in accordance with the present invention may preferably be further arranged such that the calculating section calculates the total time length of the working state and the total time length of the non-working state on a basis of (i) electric power consumed by the device in the working state and (ii) electric power consumed by the device in the non-working state.

The above configuration makes it possible to accurately and easily calculate the respective total time lengths of the working state and the non-working state of a device.

The electric power demand control device in accordance with the present invention may preferably be further arranged such that the determining section determines to select the device as the target of the electric power demand control in a case where the ratio is larger than a threshold.

The above configuration makes it possible to select, as a target of electric power demand control, a device having a low operation rate within a time period. Thus, shifting a device to the non-working state does not, for example, decrease the production efficiency of the facility in which the device is installed or cause environmental deterioration.

In order to solve the above problems, an electric power demand control system in accordance with the present invention is an electric power demand control system, including: a determining device; and an instructing device, the instructing device including: a necessity determining section configured to determine whether electric power demand control is necessary for a facility in which at least one device is installed; an inquiry section configured to, in a case where the necessity determining section has determined that the electric power demand control is necessary, inquire of the determining device about whether the at least one device is selectable as a target of the electric power demand control; and an instructing section configured to, in a case where the instructing section has received from the determining device a notification that the at least one device is selectable as the target of the electric power demand control, instruct the at least one device to shift to a non-working state, the determining device including: a calculating section configured to calculate (i) a total time length of a working state of the at least one device within a time period and (ii) a total time length of the non-working state of the at least one device within the time period; a determining section configured to determine, on a basis of a ratio of the total time length of the non-working state to the total time length of the working state, whether to select the at least one device as the target of the electric power demand control; and a notifying section configured to, in a case where the notifying section has been inquired of by the instructing device, notify the instructing device of a result of the determination by the determining section.

The above configuration makes it possible to decide, in view of the timely operation state of a device within a time period, whether to select that device as a target of electric power demand control. This allows (i) a device that does not operate much to be a target of electric power demand control and/or (ii) a device that operates sufficiently to stop being a target of electric power demand control. The above configuration thus makes it possible to advantageously alleviate, for example, (i) a decrease in production efficiency caused by electric power demand control at a facility at which production lines are installed and (ii) environmental deterioration due to electric power demand control.

The electric power demand control system in accordance with the present invention may preferably be further arranged such that the determining section determines to select the at least one device as the target of the electric power demand control in a case where the ratio is larger than a threshold.

The above configuration makes it possible to select, as a target of electric power demand control, a device having a low operation rate within a time period. Thus, shifting a device to the non-working state does not, for example, decrease the production efficiency of the facility in which the device is installed or cause environmental deterioration.

The electric power demand control system in accordance with the present invention may preferably be further arranged such that the instructing device further includes a providing section configured to provide the determining device with the threshold for use by the determining device.

The above configuration makes it possible to, depending on the situation of the facility in which a device is installed, flexibly change the threshold for determining whether to select the device as a target of electric power demand control.

The electric power demand control system in accordance with the present invention may preferably be further arranged such that the necessity determining section, in a case where total electric power consumed at the facility within a time period is larger than a target electric power consumption, determines that the electric power demand control is necessary.

The electric power demand control system in accordance with the present invention may preferably further include: an electric power consumption calculating section configured to calculate electric power consumed by the at least one device after the at least one device has shifted to the non-working state.

With the above configuration, referring to electric power consumed by a device after the device has been subjected to electric power demand control makes it possible to determine whether electric power demand control will sufficiently reduce electric power consumed at the facility.

The electric power demand control system in accordance with the present invention may preferably be further arranged such that the at least one device includes a plurality of devices; the necessity determining section, after the instructing section has instructed at least one of the plurality of devices to shift to the non-working state, determines again whether the electric power demand control is necessary; and the providing section, in a case where the necessity determining section has determined again that the electric power demand control is necessary, provides each of the plurality of devices with a threshold smaller than the threshold.

With the above configuration, in a case where merely shifting a device to the non-working state will not allow for sufficient electric power demand control at a facility, lowering the threshold for the individual devices can increase the number of devices as a target of electric power demand control. This ensures electric power demand control at the facility.

The electric power demand control system in accordance with the present invention may preferably be further arranged such that the at least one device is connected to another device configured to operate in conjunction with the at least one device; the at least one device, after the at least one device has been instructed to shift to the non-working state, shifts to the non-working state and notifies the other device that electric power consumed by the at least one device has decreased; and the other device shifts to the non-working state after the other device has been notified that the electric power consumed by the at least one device has decreased.

The above configuration eliminates the need to provide an instruction to shift to the non-working state for another device that operates in conjunction with the device. This saves trouble of connecting the instructing device to another device.

The electric power demand control system in accordance with the present invention may preferably be further arranged such that the other device is (i) an open-close valve for compressed air, (ii) a power supply device for an exhaust duct, (iii) a power supply device for air conditioning, or (iv) a control device for the air conditioning.

The above configuration allows an open/close valve, a control device for an exhaust duct, a power supply device for air conditioning, or a control device for air conditioning, which do not need to operate when the device is in the non-working state, to be set to the non-working state, and thus makes it possible to save electric power for operating the other devices.

The electric power demand control system in accordance with the present invention may preferably be further arranged such that the determining device is disposed in the at least one device.

The above configuration can save space for installing the determining device.

The electric power demand control device according to the foregoing embodiments of the present invention may be in the form of a computer. In this case, the present invention encompasses: a control program for the electric power demand control device which program causes a computer to operate as each of the above sections of the electric power demand control device so that the electric power demand control device can be in the form of a computer; and a non-transitory computer-readable storage/recording medium storing the control program.

Advantageous Effects of Invention

An aspect of the present invention makes it possible to advantageously alleviate, for example, (i) a decrease in production efficiency caused by electric power demand control at a facility at which production lines are installed and (ii) environmental deterioration due to electric power demand control.

DESCRIPTION OF EMBODIMENTS

Embodiment 1

The following description will discuss a first embodiment of the present invention with reference to FIGS. 1 through 4.

Figure 2:
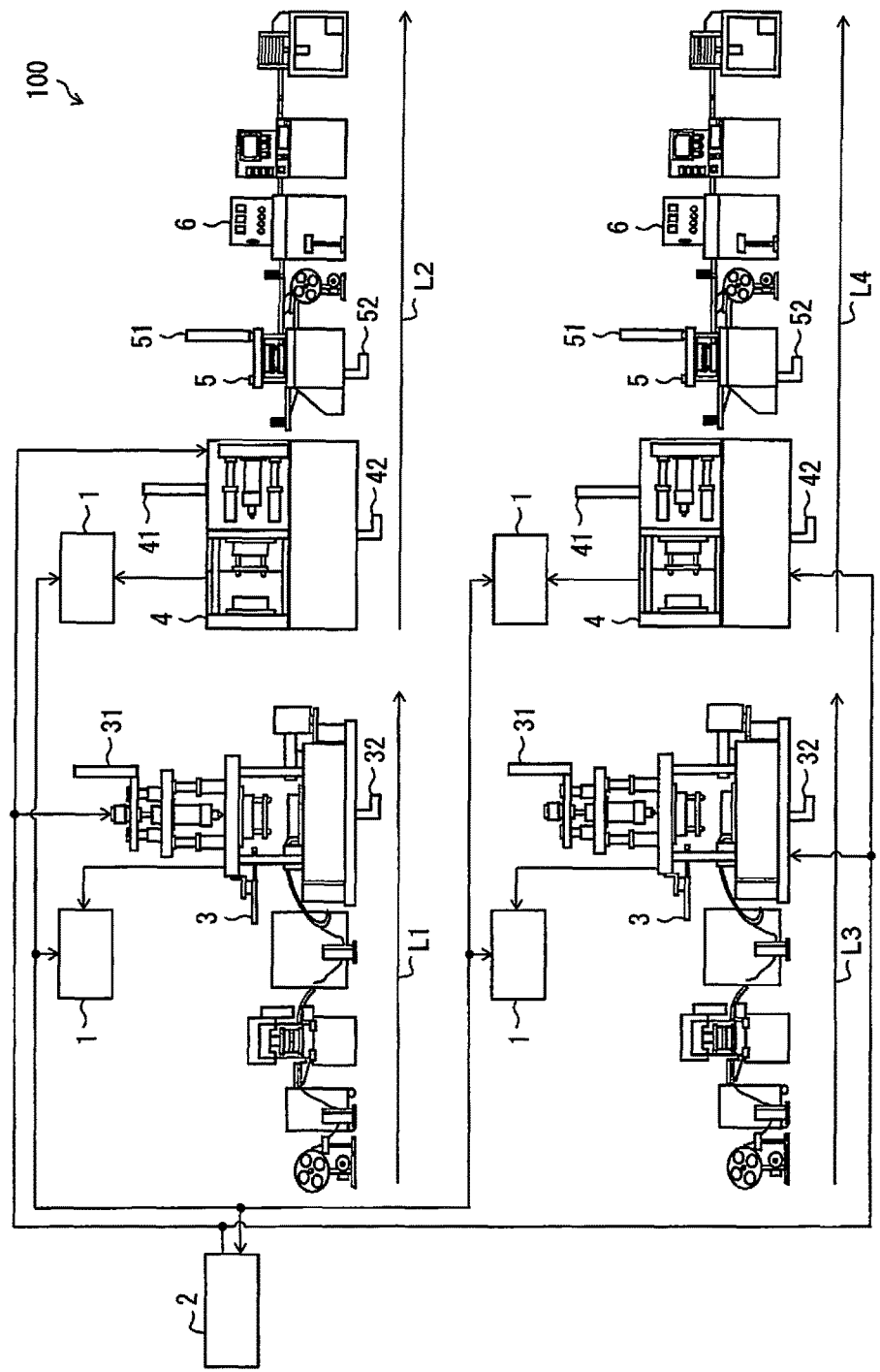
FIG. 2 is a diagram illustrating respective configurations of production lines and a configuration of an electric power demand control system in accordance with the first embodiment of the present invention.

The following description will first discuss respective configurations of production lines L1 to L4 and a configuration of an electric power demand control system 100 in accordance with the first embodiment with reference to FIG. 2. FIG. 2 is a diagram illustrating (i) respective configurations of the production lines L1 to L4 and (ii) a configuration of the electric power demand control system 100 in accordance with the first embodiment of the present invention.

The production lines L1 to L4 illustrated in FIG. 2 are each a production installation for installing various production devices (device) configured to produce a product automatically. The production lines L1 to L4 are housed in a single facility (factory).

The production lines L1 and L3 each include a presswork device 3. The presswork device 3 presses such metal components necessary for a product as electrode terminals. A product processed on each of the production lines L1 and L3 is carried to the corresponding one of the production lines L2 and L4. The production lines L2 and L4 each include an integration molding device 4, a bending device 5, and a quality inspection device 6. The integration molding device 4 molds the product in such a manner as to integrate the product with (i) terminals and (ii) a resin material for a housing of the product. The bending device 5 bends the terminals. The quality inspection device 6 inspects the quality of the product and aligns products.

The presswork devices 3, the integration molding devices 4, the bending devices 5, and the quality inspection devices 6 on the production lines L1 to L4 are each capable of being operated automatically. The presswork devices 3, the integration molding devices 4, the bending devices 5, and the quality inspection devices 6 may, for example, each be operated in an unattended, automated manner during midnight hours to be involved in an automated production of a product.

(Electric Power Demand Control System 100)

The first embodiment is configured such that electric power consumption demand at a factory at which the production lines L1 to L4 are installed is controlled by an electric power demand control system 100. The electric power demand control system 100, as illustrated in FIG. 2, includes four electric power controllers 1 (determining device) and a single demand controller 2 (instructing device).

The electric power controllers 1 are provided one-to-one for the production lines L1 to L4 at the factory. The four electric power controllers 1 are all connected to the demand controller 2. The first embodiment is configured such that each electric power controller 1 is provided for one of the devices included in the corresponding production line; for instance, the electric power controller 1 for the production line L1 is integrated with the presswork device 3 on the production line L1, whereas the electric power controller 1 for the production line L2 is integrated with the integration molding device 4 on the production line L2. This can save space for installing the electric power controllers 1 in the factory.

The electric power demand control system 100 is configured such that a single demand controller 2 and four electric power controllers 1 operate together to control electric power demand at the factory. The demand controller 2 compares (i) electric power consumed at the entire factory within a time period (or at a time point) with (ii) target electric power consumption preset for the demand controller 2 to determine whether electric power demand control is necessary for the factory. The demand controller 2, in a case where it has determined that electric power demand control is necessary, inquires of each electric power controller 1 about whether electric power consumption for the corresponding production line can be a target of electric power demand control. The electric power demand control for a production line means electric power demand control for all the devices on that production line.

Each electric power controller 1, in response to an inquiry from the demand controller 2, determines whether the corresponding production line can be a target of electric power demand control, and notifies (responds to) the demand controller 2 of the determination result. The demand controller 2 then performs electric power demand control on the basis of notifications from the electric power controllers 1; specifically, the demand controller 2 provides an instruction to shift to a non-working state for a device that is (i) included in a production line which the corresponding electric power controller 1 has determined as capable of being a target of electric power demand control and that is (ii) monitored by the electric power controller 1. This causes a shift to a non-working state for each device instructed to shift to a non-working state and other devices on the production line, and thus controls electric power demand for each production line. This in turn reduces electric power consumption at the factory, and can thus prevent an increase of the electric power basic charge for the following month.

Each electric power controller 1 constantly monitors the operation state of each device on the corresponding production line, and records the transition of the operation state. Each electric power controller 1, in response to an inquiry from the demand controller 2, calculates the ratio of (i) the total time length of the non-working state of each device to (ii) the total time length of the working state of the device both within a time period, and compares the ratio with a threshold. The electric power controller 1, in a case where the ratio is larger than the threshold, determines that the device can be a target of electric power demand control, and in a case where the ratio is not larger than the threshold, determines that the device cannot be a target of electric power demand control. On the basis of such determination, the electric power demand control system 100 can alleviate, for example, (i) a decrease in production efficiency caused by electric power demand control at a facility at which production lines are installed and (ii) environmental deterioration due to electric power demand control. Further, the electric power demand control system 100 can ideally perform electric power demand control that causes no decrease in production efficiency at a facility at which production lines are installed and that causes no environmental deterioration.

(Configuration of Electric Power Controller 1)

Figure 1:
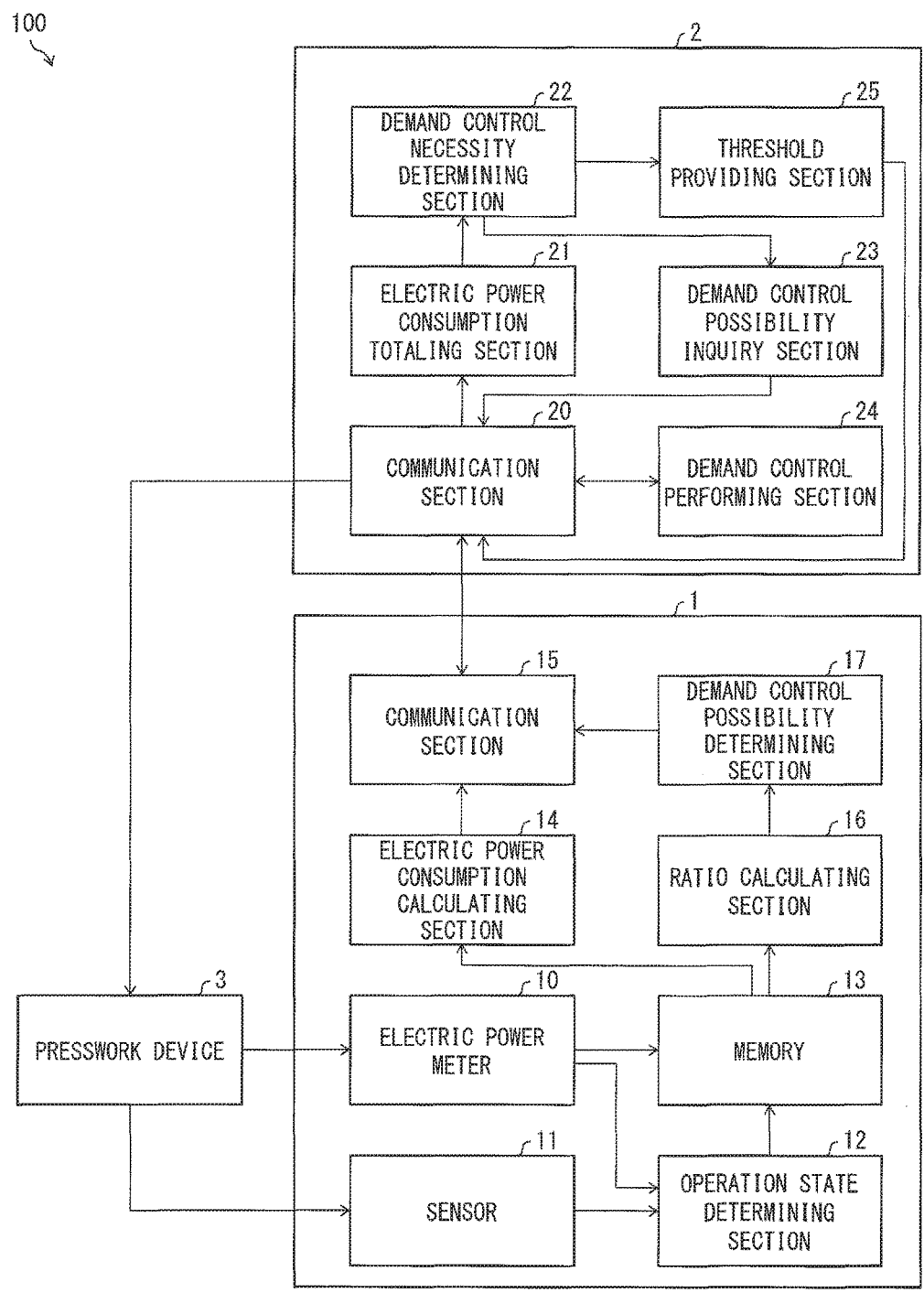
FIG. 1 is a block diagram illustrating a configuration of an electric power controller and a configuration of a demand controller in accordance with a first embodiment of the present invention.

The following description will discuss respective configurations of the electric power controllers 1 and the demand controller 2 with reference to FIG. 1. FIG. 1 is a block diagram illustrating a configuration of an electric power controller 1 and a configuration of the demand controller 2 in accordance with the first embodiment of the present invention. The electric power controller 1, as illustrated in FIG. 1, includes an electric power meter 10, a sensor 11, an operation state determining section 12, a memory 13, an electric power consumption calculating section 14, a communication section 15, a ratio calculating section 16 (calculating section), and a demand control possibility determining section 17 (determining section, notifying section). This electric power controller 1 of FIG. 1 is an electric power controller 1 included in the production line L1. The electric power controllers 1 included in the other production lines each have a configuration similar to the configuration illustrated in FIG. 1.

The following description will briefly discuss the functions of the individual members of the electric power controller 1. The electric power meter 10 measures electric power consumed by the corresponding presswork device 3, and records the result of the measurement of the electric power consumption in the memory 13. The sensor 11 detects the state of a working part of the presswork device 3. The sensor 11 is, as a non-limiting example, a position sensor or an image sensor.

The operation state determining section 12 determines the operation state of the presswork device 3 on the basis of the result of the measurement by the electric power meter 10 or the result of the detection by the sensor 11, and records the determination result in the memory 13. The electric power consumption calculating section 14 calculates, on the basis of the results of electric power consumption measurement that are recorded in the memory 13, the total amount of electric power consumed by the presswork device 3 within the time period. The communication section 15 transmits and receives signals to and from the demand controller 2.

The ratio calculating section 16 calculates the ratio of (i) the total time length of the non-working state of the presswork device 3 to (ii) the total time length of the working state of the presswork device 3 both within the time period on the basis of the results of operation state determination that are recorded in the memory 13. The demand control possibility determining section 17 determines, on the basis of the ratio calculated, whether the presswork device 3 is to be a target of electric power demand control.

As for the first embodiment, determining whether the presswork device 3 can be a target of electric power demand control means the same as determining whether the production line L1, on which the presswork device 3 is installed, is to be a target of electric power demand control. This is because electric power demand control for the presswork device 3 results in electric power demand control for the production line L1.

(Configuration of Demand Controller 2)

The demand controller 2, as illustrated in FIG. 1, includes a communication section 20, an electric power consumption totaling section 21, a demand control necessity determining section 22 (necessity determining section), a demand control possibility inquiry section 23 (inquiry section), a demand control performing section 24 (instructing section), and a threshold providing section 25 (providing section).

The following description will briefly discuss the functions of the individual members of the demand controller 2. The communication section 20 transmits and receives signals to and from the electric power controller 1, and also transmits a signal to the presswork device 3. The electric power consumption totaling section 21 totals electric power consumed by each device in the factory to calculate electric power consumed at the entire factory within the time period. The demand control necessity determining section 22 determines, on the basis of the calculated electric power consumed at the entire factory, whether electric power demand control is necessary for the factory.

The demand control possibility inquiry section 23, in a case where the demand control necessity determining section has determined that electric power demand control is necessary for the factory, inquires of each electric power controller 1 about whether the corresponding production line can be a target of electric power demand control. The demand control performing section 24 performs electric power demand control for the factory on the basis of notifications from the electric power controllers 1. The threshold providing section 25 provides each electric power controller 1 with a threshold for use in the determination. The threshold providing section 25 may further change the value of the threshold as necessary and provide each electric power controller 1 with the threshold as changed.

(Flow of Process of Electric Power Demand Control)

Figure 3:
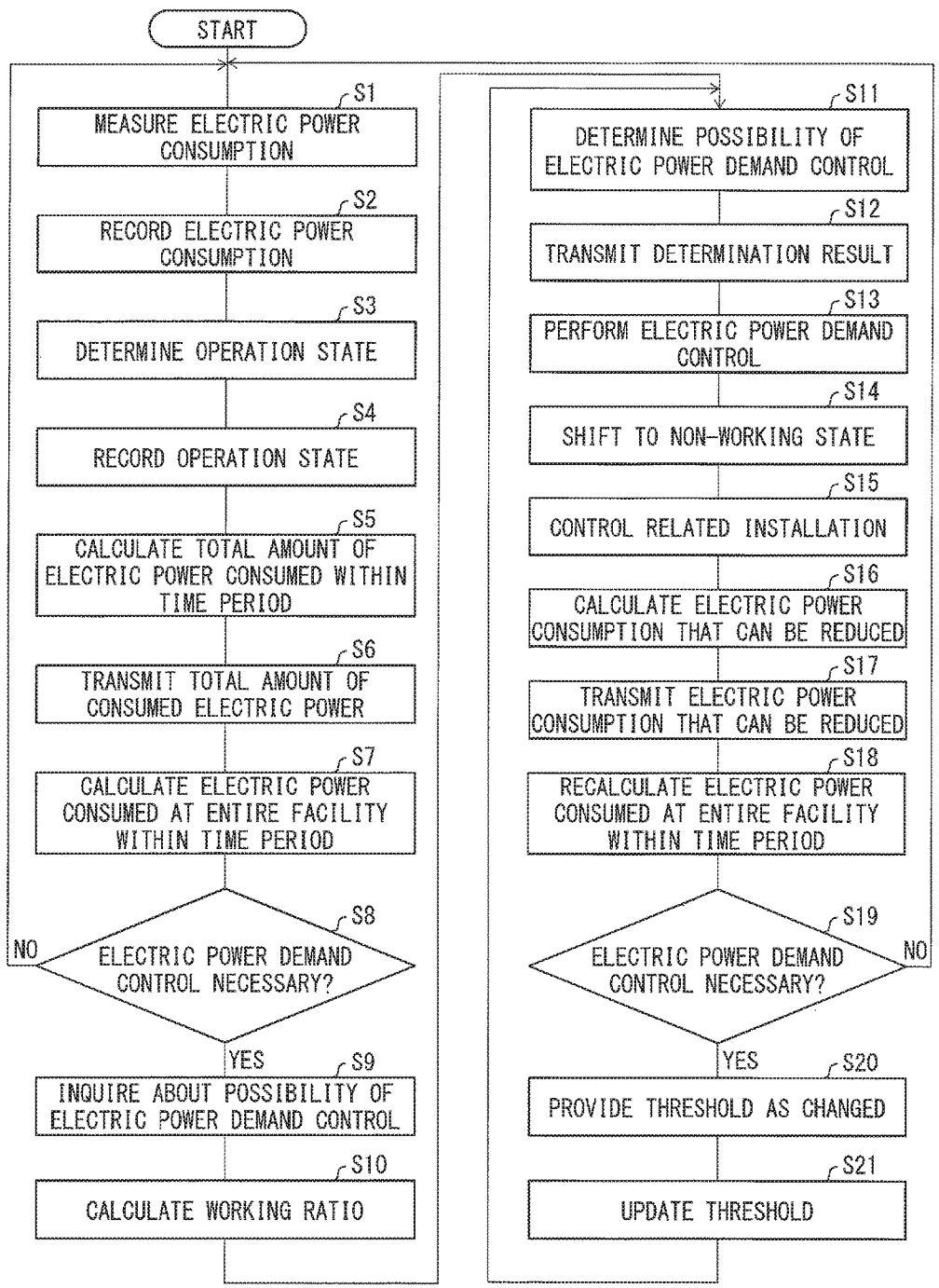
FIG. 3 is a flowchart illustrating a flow of an electric power demand control process performed by an electric power demand control system in accordance with the first embodiment of the present invention.
Figure 4:
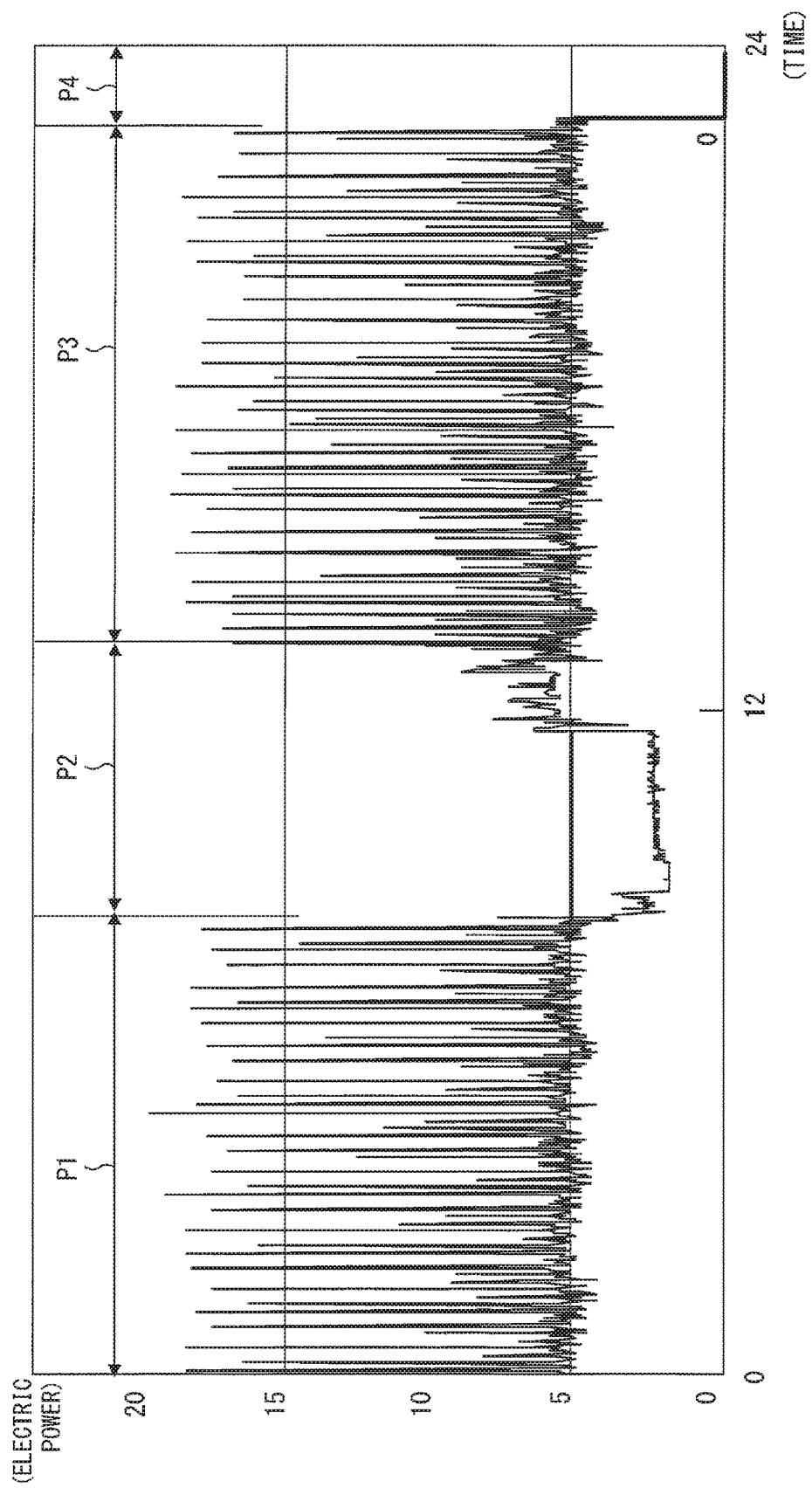
FIG. 4 is a graph illustrating an example of respective temporal transitions of electric power consumed by a presswork device and the operation state of the presswork device which temporal transitions are recorded in a memory in the first embodiment of the present invention.
Figure 5:
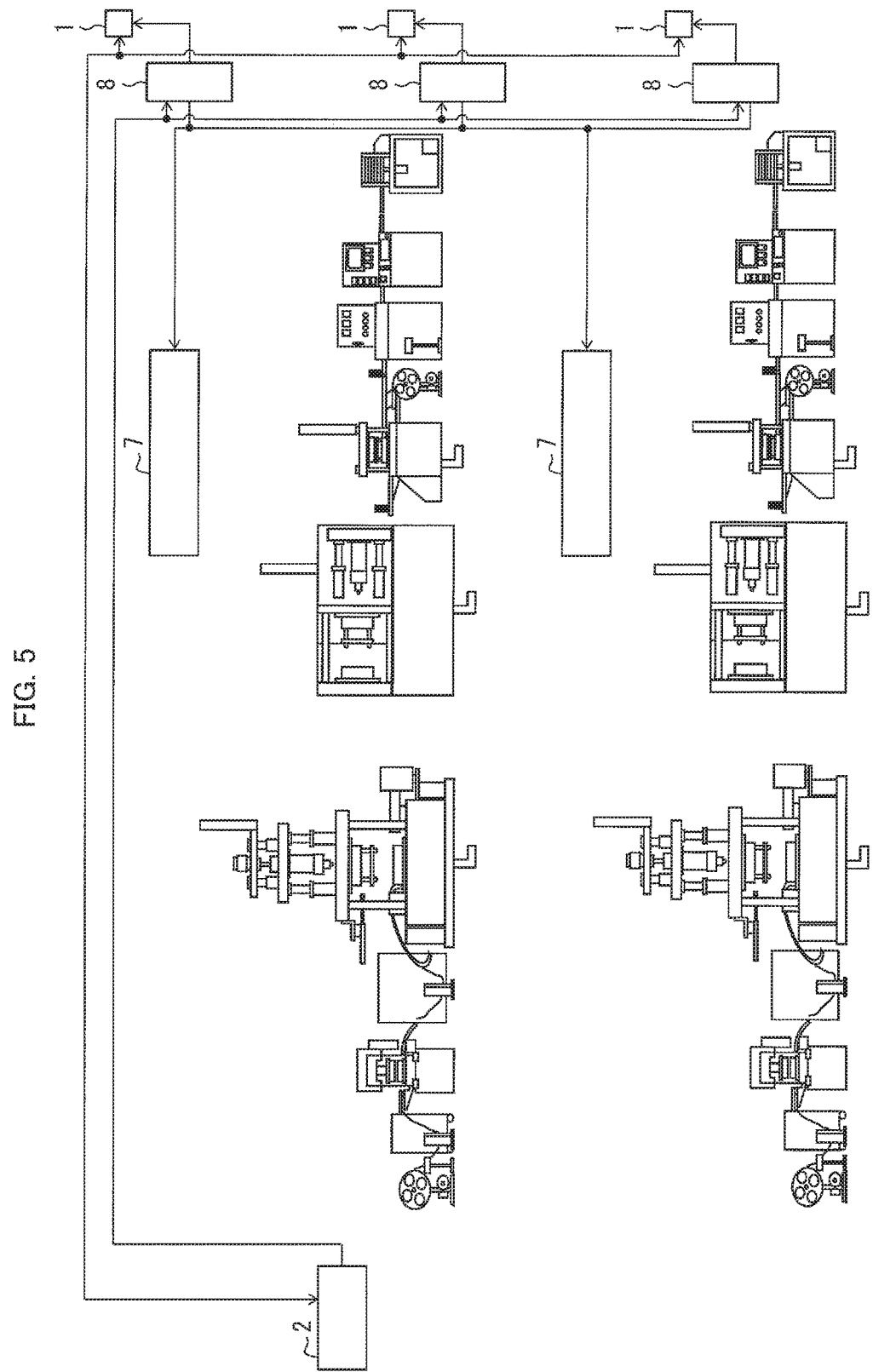
FIG. 5 is a diagram illustrating a configuration of an electric power demand control system in accordance with a third embodiment of the present invention.

The following description will discuss a flow of an electric power demand control process of the first embodiment with reference to FIGS. 3 through 5. FIG. 3 is a flowchart illustrating a flow of an electric power demand control process performed by the electric power demand control system 100 in accordance with the first embodiment of the present invention.

During operation of the production lines L1 to L4, the demand controller 2 has a target electric power consumption preset for electric power demand control for the factory. The target electric power consumption is, for example, set for each factory as an energy saving target value. The target electric power consumption may alternatively be set on the basis of demand-contract electric power from an electric power company or in response to a request from an electric power company.

On the production line L1, the electric power meter 10 measures electric power consumed by the presswork device 3 (step S1). The electric power meter 10 records the measured electric power consumption in the memory 13 (step S2), and outputs a signal indicative of the measured electric power consumption to the operation state determining section 12. The operation state determining section 12 determines the operation state of the presswork device 3 on the basis of the measured electric power consumption. The presswork device 3 is in either the working state or the non-working state on the production line. The presswork device 3 is, when in the working state, in the process of producing a product, and when in the non-working state, on standby or at a stop due to a situation such as a wait for a material, a setup change, a breakdown, or activation. The non-working state thus covers a standby state and a stopped state.

The operation state determining section 12 compares the electric power consumption with a threshold, and specifies the operation state of the presswork device 3 on the basis of the comparison result. For instance, the operation state determining section 12, in a case where the electric power consumption is larger than a first threshold, determines that the presswork device 3 is in the working state, and otherwise determines that the presswork device 3 is in the non-working state.

The operation state determining section 12, in a case where the electric power consumption is between the first threshold and a second threshold (which is smaller than the first threshold), determines that the presswork device 3 is in the standby state. The operation state determining section 12, in a case where the electric power consumption is not larger than the second threshold, determines that the presswork device 3 is in the stopped state. The operation state determining section 12 records the determined operation state in the memory 13 (step S4).

Each electric power controller 1 performs the steps S1 to S4 regularly to record in the memory 13 (i) a temporal transition of electric power consumed by the presswork device 3 and (ii) a temporal transition of the operation state of the presswork device 3.

FIG. 4 is a graph illustrating an example of respective temporal transitions of the electric power consumed by the presswork device 3 and the operation state of the presswork device 3 which temporal transitions are recorded in the memory 13 in the first embodiment of the present invention. The graph has a horizontal axis indicative of time and a vertical axis indicative of electric power consumption at different time points. The graph shows a line (waveform) indicative of a temporal transition of the electric power consumed by the presswork device 3 over a day. The graph also shows periods P1 to P4 indicative of a temporal transition of the operation state of the presswork device 3.

The periods P1 and P3 each show sufficiently high electric power consumption, and thus indicate continuation of the working state. The period P2 shows electric power consumption that is larger than zero but is sufficiently lower than the electric power consumption during the period P1, and thus indicates continuation of the standby state. The period P4 shows zero electric power consumption, and thus indicates continuation of the stopped state. The periods P3 and P4 each indicate continuation of the non-working state.

The electric power consumption calculating section 14 calculates the total amount of electric power consumed by the presswork device 3 within the time period (step S5). The time period is, as a non-limiting example, 30 minutes, which is a reference time period for reviewing an electric power demand contract. The electric power consumption calculating section 14 calculates the total amount of the consumed electric power with use of data of a temporal transition of the electric power consumption which data is recorded in the memory 13. The electric power consumption calculating section 14, for example, adds up the electric power consumption over the immediately past 30 minutes to calculate the total amount of the consumed electric power. The electric power consumption calculating section 14 transmits a signal indicative of the calculated total amount of the consumed electric power to the demand controller 2 through the communication section 15 (step S6).

The steps S1 to S6 are performed on each of the production lines L2 to L4 as well. The electric power controller 1 for the production line L2 calculates the total amount of electric power consumed by the presswork device 3 on the production line L2, and transmits a signal indicative of the total amount of the consumed electric power to the demand controller 2. The electric power controller 1 for the production line L3 calculates the total amount of electric power consumed by the integration molding device 4 on the production line L3, and transmits a signal indicative of the total amount of the consumed electric power to the demand controller 2. The electric power controller 1 for the production line L4 calculates the total amount of electric power consumed by the integration molding device 4 on the production line L4, and transmits a signal indicative of the total amount of the consumed electric power to the demand controller 2.

The first embodiment is, as described above, configured as follows: The four electric power controllers 1 each provide the demand controller 2 with a signal indicative of the total amount of electric power consumed by a device as a monitoring target (namely, the presswork device 3 or the integration molding device 4). The communication section 20 of the demand controller 2 receives such information on the total amount of the consumed electric power from each electric power controller 1, and outputs the information to the electric power consumption totaling section 21.

The demand controller 2 also receives a signal indicative of electric power consumed by other devices in the factory within the time period (details omitted). The electric power consumption totaling section 21 totals all the received total amounts of the consumed electric power to calculate electric power consumed at the entire factory (step S7).

(Determining Whether Electric Power Demand Control is Necessary)

The demand control necessity determining section 22 compares (i) the calculated electric power consumed at the entire factory with (ii) a preset target electric power consumption to determine whether electric power demand control is necessary for the factory (step S8). Specifically, the demand control necessity determining section 22, in a case where the electric power consumed at the entire factory is larger than the target electric power consumption, determines that electric power demand control is necessary, and otherwise determines that electric power demand control is unnecessary.

Setting the target electric power consumption at a value smaller than demand-contract electric power allows electric power demand control for the factory to be performed preventively.

If the determination in the step S8 results in "false" (NO), the process of FIG. 3 returns to the step S1. The steps S1 to S8 are repeated until the demand control necessity determining section 22 determines that electric power demand control is necessary. If the determination in the step S8 results in "true" (YES), the demand control possibility inquiry section 23 inquires of the electric power controller 1 about whether the production line L1 can be a target of electric power demand control (step S9).

The ratio calculating section 16, in response to the inquiry, calculates (i) the total time length of the working state of the presswork device 3 within the time period and (ii) the total time length of the non-working state of the presswork device 3 within the time period. For the calculation of the total time lengths, the ratio calculating section 16 refers to a temporal transition of the operation state recorded in the memory 13.

The first embodiment is configured such that the above time period is, for example, one to two days immediately before the start of electric power demand control. The ratio calculating section 16 reads from the memory 13 data of a temporal transition of the operation state for such a time period, and totals the time period of the working state and the time period of the non-working state separately. For instance, the ratio calculating section 16 totals the periods P1 and P3 in FIG. 4 to calculate the total time length of the working state, and totals the periods P2 and P4 in FIG. 4 to calculate the total time length of the non-working state. The ratio calculating section 16 then calculates the ratio of (i) the calculated total time length of the non-working state to (ii) the calculated total time length of the working state (step S10).

(Determining Whether Electric Power Demand Control is Possible)

The demand control possibility determining section 17 compares the calculated ratio with a preset threshold to determine whether the production line L1 can be a target of electric power demand control (step S11). Specifically, the demand control possibility determining section 17, in a case where the ratio is larger than the threshold, determines that the production line L1 can be a target of electric power demand control, and otherwise determines that the production line L1 cannot be a target of electric power demand control. The demand control possibility determining section 17 transmits a signal indicative of the determination result to the demand controller 2 (step S12).

In the step S9, the demand control possibility inquiry section 23 further inquires of each of the respective electric power controllers 1 for the production lines L2 to L4 about whether the corresponding production line can be subjected to electric power demand control. The steps S10 to S12 are performed on each of the production lines L2 to L4 as well through a similar procedure. The demand controller 2 consequently receives the results (four in total) of determining whether the production lines L1 to L4 can be subjected to electric power demand control. These determination results are supplied to the demand control performing section 24 through the communication section 20.

(Performing Electric Power Demand Control)

The demand control performing section 24 performs electric power demand control on the basis of the four inputted determination results (step S13) through the following procedure: The demand control performing section 24 first specifies from among the production lines L1 to L4 a production line that can be a target of electric power demand control. The description below assumes that the demand control performing section 24 has specified that the production line L1 can be a target of electric power demand control, whereas the production lines L2 to L4 cannot can be a target of electric power demand control. The demand control performing section 24 transmits, through the communication section 20 to the presswork device 3 on the production line L1, an instruction signal for an instruction to shift to the non-working state. With this signal transmission, the demand control performing section 24 instructs the presswork device 3 to shift the production line L1 to the non-working state.

The presswork device 3, when it has received the instruction signal transmitted, shifts to the non-working state (step S14), specifically to either the standby state or the stopped state. Which state the presswork device 3 is shifted to is determined in advance in the presswork device 3.

The presswork device 3, when it is shifted to the non-working state, controls the operation state of at least one other installation that is related to the production line L1 and that operates in conjunction with the presswork device 3 (step S15). Specifically, the presswork device 3 transmits, to at least one other device on the production line L1, a signal indicating that electric power consumed by the presswork device 3 has been reduced. The first embodiment is configured such that the above signal is transmitted to (i) a device for controlling an open/close valve for a supply pipe 31 provided for the presswork device 3 to supply compressed air, (ii) a power supply device for an exhaust duct 32 provided for the presswork device 3, (iii) a power supply device (not shown) for an air conditioner for, for example, adjusting the temperature near the production line L1, and (iv) a control device (not shown) for controlling, for example, the temperature setting for the air conditioner. Each of these other devices, when it has received the signal, shifts to the non-working state as well as the presswork device 3. This allows for a reduction in (i) electric power consumed by the presswork device 3 and in (ii) electric power consumed by other devices. Shifting the production line L1 to the non-working state as such allows for a reduction in electric power consumed by the entire production line L1.

In a case where the production line L3 is a target of electric power demand control, the electric power demand control system 100 performs a process similar to the electric power demand control process for the production line L1. In a case where the production line L2 is a target of electric power demand control, the electric power demand control system 100 performs the following process: The demand control performing section 24 transmits an instruction signal to the integration molding device 4 on the production line L2. The integration molding device 4 shifts to the non-working state, and transmits, to each of the bending device 5 and the quality inspection device 6 on the production line L2, a signal indicating that electric power consumed by the integration molding device 4 has been reduced. Each of the bending device 5 and the quality inspection device 6, when it has received the signal, shifts to the non-working state as well as the integration molding device 4.

The integration molding device 4 performs a similar procedure so that a shift to the non-working state is performed by (i) a device for controlling open/close of open/close valve of a supply pipe 41 provided for the integration molding device 4 to supply compressed air, (ii) a power supply device for an exhaust duct 42 provided for the integration molding device 4, (iii) a device for controlling open/close of open/close valve of a supply pipe 51 provided for the bending device 5 to supply compressed air, and (iv) a power supply device for an exhaust duct 52 provided for the quality inspection device 6.

In a case where the production line L4 is a target of electric power demand control, the electric power demand control system 100 performs a process similar to the electric power demand control process for the production line L2.

The electric power consumption calculating section 14 calculates an electric power consumption that can be reduced by electric power demand control for the production line L1 (step S16). Specifically, the electric power consumption calculating section 14 calculates, on the basis of data recorded in the memory 13, namely, (i) a temporal transition of the working state of the presswork device 3, (ii) a temporal transition of the non-working state of the presswork device 3, (iii) electric power consumed by the presswork device 3 in the working state, and (iv) electric power consumed by the presswork device 3 in the non-working state, an electric power consumption that can be reduced for the presswork device 3. The electric power consumption calculating section 14 further calculates an electric power consumption that can be reduced by at least one other device on the production line L1 shifting to the non-working state. The electric power meter 10 totals all the calculated electric power consumptions to calculate an electric power consumption to be reduced for the corresponding production line, and transmits, to the demand controller 2 through the communication section 15, a signal indicative of the calculated electric power consumption to be reduced (step S17).

The communication section 20 receives the signal transmitted by the electric power controller 1 and indicative of the electric power consumption that can be reduced, and outputs the signal to the electric power consumption totaling section 21. The electric power consumption totaling section 21 subtracts (i) the electric power consumption that can be reduced from (ii) the calculated electric power consumed at the entire factory. The electric power consumption totaling section 21 thus recalculates electric power consumed at the entire factory within a time period (step S18).

The demand control necessity determining section 22 compares (i) the recalculated electric power consumed at the entire factory with (ii) the target electric power consumption to redetermine whether electric power demand control is necessary for the factory (step S19). Specifically, the demand control necessity determining section 22, in a case where the electric power consumed at the entire factory is larger than the target electric power consumption, determines that electric power demand control is necessary, and otherwise determines that electric power demand control is unnecessary.

If the determination in the step S19 results in "false" (NO), there is no need to further increase the number of production lines to be subjected to electric power demand control, and the process of FIG. 3 returns to the step S1. This is because performing electric power demand control for the production line L1 has sufficiently reduced electric power consumed at the factory so that the electric power consumption at the factory has fallen below the target electric power consumption. If the determination in the step S19 results in "true" (YES), the threshold providing section 25 changes the threshold from the value provided immediately previously for each electric power controller 1 to a smaller value, and provides the threshold as changed for each electric power controller 1 through the communication section 20 (step S20). The communication section 15 receives the threshold provided, and outputs the threshold to the demand control possibility determining section 17. The demand control possibility determining section 17 updates the threshold from the current value to the value of the inputted threshold as changed (step S21). The process of FIG. 3 then returns to the step S11. The demand control possibility determining section 17 uses the updated threshold to determine whether a production line can be a target of electric power demand control.

The threshold as changed is smaller than the threshold used in the immediately previous determination, whereas the ratio is unchanged. This indicates a higher possibility that even if the demand control possibility determining section 17 previously determined as the result of the ratio being smaller than the threshold that a production line cannot be a target of electric power demand control, the demand control possibility determining section 17 will this time determine as the result of the ratio being larger than the threshold that the same production line can be a target of electric power demand control. As illustrated in FIG. 3, the steps S11 to S21 are repeated while the determination in the step S19 results in "false" (NO). The electric power demand control system 100 repeatedly decreases the threshold until electric power consumed at the entire factory falls below the target electric power consumption to continue increasing the number of production lines as a target of electric power demand control. This allows reliable electric power demand control to be performed for the factory.

The series of steps shown in FIG. 3 can alternatively be performed by means of computer simulation. This means that it is possible to specify production lines in a number necessary for electric power demand control for the factory without actually shifting the production lines to the non-working state.

(Advantages of First Embodiment)

As described above, the electric power demand control system 100 can decide, in view of the timely operation state of a production line (specifically, a presswork device 3 or the like) within a time period, whether to select that production line as a target of electric power demand control. This allows (i) a device that does not operate much to be a target of electric power demand control and/or (ii) a device that operates sufficiently to stop being a target of electric power demand control. With the above configuration, the electric power demand control system 100 can alleviate, for example, (i) a decrease in production efficiency caused by electric power demand control at a facility at which production lines are installed and (ii) environmental deterioration due to electric power demand control. Further, the electric power demand control system 100 can ideally perform electric power demand control that causes no decrease in production efficiency at a facility at which production lines are installed and that causes no environmental deterioration.

Further, the electric power demand control system 100 decides on a production line as a target of electric power demand control on the basis of the operation state of each production line within a period of one to two days immediately before the start of electric power demand control. This allows the electric power demand control system 100 to enjoy the following advantages:

(1) The electric power demand control system 100 can prevent a large decrease in production efficiency caused by setting an efficiently and smoothly operating production line on standby.

(2) The electric power demand control system 100 can prevent such control that greatly influences the yield as setting a production line with a good yield on standby and a production line with a poor yield in operation.

Further, the electric power demand control system 100 selects a target of electric power demand control on the basis of not (i) the value of electric power consumed by a production device on a production line, but (ii) the ratio of the total time length of the non-working state to the total time length of the working state. This allows the electric power demand control system 100 to enjoy the following advantages:

(3) The electric power demand control system 100 can perform evaluation by a general method based on a criterion without being influenced by electric power consumed by a production device which electric power changes depending on the production condition.

(4) The electric power demand control system 100 can be constructed as a general electric power demand control system that can use an identical evaluation method for even different production lines including different production devices with different electric power consumptions.

(5) In a case where a production line has been shifted to the standby state or the stopped state as the result of electric power demand control, the electric power demand control system 100 can add a production tact as a production schedule value to the time period of continuation of the standby state or the stopped state to learn about a loss in the production volume at the factory.

Further, the electric power demand control system 100 performs electric power demand control for at least one of the production devices included in a production line, and also performs electric power demand control for at least one other related production device or factory installation on the basis of a signal outputted by the production device for which the electric power demand control system 100 has performed electric power demand control. This allows the electric power demand control system 100 to enjoy the following advantages:

(6) The electric power demand control system 100 can perform electric power demand control for a factory installation in accordance with the operation state of the production line to ensure that labor health and safety are maintained.

(7) The electric power demand control system 100 can be constructed as an electric power demand control system that performs electric power demand control for a small number of production devices to additionally perform electric power demand control for at least one other related device or factory installation in a chain manner. The electric power demand control system 100 can thus greatly reduce electric power consumption by an easy and convenient method.

(Variations)

The electric power controller 1 and the demand controller 2 are not necessarily separate from each other: An embodiment of the present invention may be an electric power demand control device that performs the functions of both the electric power controller 1 and the demand controller 2. Such an electric power demand control device at least includes (i) a demand control possibility determining section 17 for calculating the respective total time lengths of the working state and the non-working state of the production line L1 (presswork device 3) within a time period and determining, on the basis of the ratio of the total time length of the non-working state to the total time length of the working state, whether to select the production line L1 as a target of electric power demand control and (ii) a demand control performing section 24 for, in a case where the demand control possibility determining section 17 has determined to select the production line L1 as a target of electric power demand control, instructing the presswork device 3 on the production line L1 to shift the production line L1 to the non-working state.

Second Embodiment

The following description will discuss a second embodiment of the present invention. Any member of the second embodiment that is common between the first embodiment and the second embodiment is assigned a common reference numeral, and is not detailed here.

The second embodiment is configured such that after the production line L1 has been shifted to the non-working state, the corresponding electric power controller 1 calculates, on the basis of a temporal transition recorded in the memory 13 of the non-working state of the presswork device 3 on the production line L1, a loss in the production volume which loss has been caused by electric power demand control for the production line. Each electric power controller 1 has, set in advance as production tact, data of the number of products produced on the corresponding production line per unit time period. The electric power controller 1 adds the production tact to the time period (total time length) of continuation of the non-working state of the production line after electric power demand control to calculate a loss in the production volume caused within the time period of continuation. This allows a staff member at the factory to learn early about a delay in the production schedule caused by electric power demand control being performed.

Third Embodiment

The following description will discuss a third embodiment of the present invention with reference to FIG. 5. Any member of the third embodiment that is common between the first and second embodiments and the third embodiment is assigned a common reference numeral, and is not detailed here.

FIG. 5 is a diagram illustrating a configuration of an electric power demand control system 100 in accordance with the third embodiment of the present invention. The electric power demand control system 100 in accordance with the third embodiment is identical in configuration to the electric power demand control system 100 in accordance with the first embodiment, but is different from the electric power demand control system 100 in accordance with the first embodiment in terms of the target of electric power demand control: The electric power demand control system 100 in accordance with the third embodiment performs electric power demand control for an air-conditioning installation (device) in a factory.

As illustrated in FIG. 5, the factory is provided with two indoor conditioning machines 7 and three outdoor conditioning machines 8. The indoor conditioning machines 7 are installed inside the factory, whereas the outdoor conditioning machines 8 are installed outside the factory. The two indoor conditioning machines 7 are controlled by the three outdoor conditioning machines 8. Distributing a cooling or heat load among a plurality of outdoor conditioning machines 8 can prevent a heavy load on a single outdoor conditioning machine 8. In a case where the load of air conditioning for the factory is light, on the other hand, one or more outdoor conditioning machines 8 may be in the standby state (that is, operating at no load).

The third embodiment includes electric power controllers 1 for the respective outdoor conditioning machines 8. The electric power controllers 1 each monitor its corresponding outdoor conditioning machine 8. Specifically, each electric power controller 1, in a case where it has received from the demand controller 2 an inquiry about whether electric power demand control can be performed, calculates the ratio of the total time length of the non-working state (that is, the standby state at no load) of the corresponding outdoor conditioning machine 8 to the total time length of the working state (operating state) of the outdoor conditioning machine 8 within a time period, and in a case where the ratio for the corresponding outdoor conditioning machine 8 is larger than a threshold, determines that the outdoor conditioning machine 8 can be a target of electric power demand control. The demand controller 2 specifies, on the basis of the determination results, an outdoor conditioning machine 8 as a target of electric power demand control. This allows the electric power demand control system 100 to preferentially shift an outdoor conditioning machine 8 that has been at no load for an extended time period to the non-working state. Such an outdoor conditioning machine 8 that remains at no load for an extended time period merely operates in an auxiliary manner to maintain a good environment in the factory. Shifting such an outdoor conditioning machine 8 to the non-working state does not greatly influence the maintenance of the environment in the factory.

As described above, the electric power demand control system 100 in accordance with the third embodiment can alleviate environmental deterioration in a factory which environmental deterioration is due to electric power demand control, and can ideally perform electric power demand control for a factory without causing environmental deterioration in the factory.

Fourth Embodiment

The following description will discuss a fourth embodiment of the present invention. Any member of the third embodiment that is common between the first, second, and third embodiments and the fourth embodiment is assigned a common reference numeral, and is not detailed here.

The fourth embodiment is configured as follows: The operation state determining section 12 determines the operation state of the presswork device 3 on the basis of not (i) electric power consumption by the presswork device 3 which electric power consumption is measured by the electric power meter 10, but (ii) the state of the presswork device 3 which state is detected by the sensor 11. The operation state determining section 12 records in the memory 13 a temporal transition of the operation state on the basis of the determination result. The ratio calculating section 16 calculates the total time length of the working state of the presswork device 3 within a time period on the basis of the result of detection performed by the sensor 11 when the presswork device 3 is in the working state. The ratio calculating section 16 further calculates the total time length of the non-working state of the presswork device 3 within the time period on the basis of the result of detection performed by the sensor 11 when the presswork device 3 is in the non-working state. The ratio calculating section 16 can, as described above, calculate the ratio of the non-working state to the working state with use of the result of detection by the sensor 11.

The kind of the sensor 11 is selected on the basis of a device as a monitoring target on a production line. For instance, in a case where the device has a part that moves during operation, the electric power controller 1 includes a position sensor as the sensor 11. In a case where the device has a part that generates heat, the electric power controller 1 includes a heat sensor as the sensor 11. In a case where the device vibrates strongly during operation, the electric power controller 1 includes a vibration sensor as the sensor 11. In a case where the device uses lamps in such a manner that the working state and the stopped state are distinguished from each other, the electric power controller 1 includes an illuminance sensor as the sensor 11.

Using a combination of different sensors among the various kinds above allows the operation state determining section 12 to use results of detection by such different sensors for the determination. This allows the operation state determining section 12 to determine the operation state of a device more accurately.

Software Implementation Example

Control blocks (particularly) of the electric power controller 1 or the demand controller 2 can be realized by a logic circuit (hardware) provided in an integrated circuit (IC chip) or the like or can be alternatively realized by software as executed by a central processing unit (CPU).

In the latter case, the electric power controller 1 or the demand controller 2 includes: a CPU that executes instructions of a program that is software realizing the foregoing functions; a read only memory (ROM) or storage device (each referred to as "storage medium") storing the program and various kinds of data in such a form that they are readable by a computer (or a CPU); and a random access memory (RAM) that develops the program in executable form. The object of the present invention can be achieved by a computer (or a CPU) reading and executing the program stored in the storage medium.

The storage medium may be "a non-transitory tangible medium" such as a tape, a disk, a card, a semiconductor memory, and a programmable logic circuit. Further, the program may be supplied to or made available to the computer via any transmission medium (such as a communication network and a broadcast wave) which enables transmission of the program. Note that the present invention can also be implemented by the program in the form of a computer data signal embedded in a carrier wave which is embodied by electronic transmission.

The present invention is not limited to the description of the embodiments above, but may be altered in various ways by a skilled person within the scope of the claims. Any embodiment based on a proper combination of technical means disclosed in different embodiments is also encompassed in the technical scope of the present invention. Further, combining technical means disclosed in different embodiments can provide a new technical feature.

INDUSTRIAL APPLICABILITY

The present invention is applicable to an electric power demand control device or electric power demand control system each of which performs electric power demand control for a facility such as a factory or an office.

REFERENCE SIGNS LIST 1 electric power controller
2 demand controller
3 presswork device
4 integration molding device
5 bending device
6 quality inspection device
7 indoor conditioning machine
8 outdoor conditioning machine
10 electric power meter
11 sensor
12 operation state determining section
13 memory
14 electric power consumption calculating section
15 communication section
16 ratio calculating section
17 demand control possibility determining section
20 communication section
21 electric power consumption totaling section
22 demand control necessity determining section
23 demand control possibility inquiry section
24 demand control performing section
25 threshold providing section
100 electric power demand control system
L1 to L4 production line

The invention claimed is:

1. An electric power demand control device, comprising a processor configured with a program to implement:
   a necessity determining section configured to determine whether electric power demand control is necessary for a facility in which a plurality of loads are installed;
   an inquiry section configured to, for each of the plurality of loads, when the necessity determining section has determined that the electric power demand control is necessary, inquire whether one of the plurality of loads is selectable as a target of the electric power demand control;
   a generating section configured to generate, for each of the plurality of loads, (i) a total time length of a working state of one of the plurality of loads within a time period and (ii) a total time length of a non-working state of the one of the plurality of loads within the time period;
   a determining section configured to determine, for each of the plurality of loads, based on a ratio of the total time length of the non-working state to the total time length of the working state and a threshold for the ratio, whether to select the one of the plurality of loads as a target of electric power demand control;
   an instructing section configured to, for each of the plurality of loads, when the instructing section has received from the notifying section a notification that the one of the plurality of loads is selected as the target of the electric power demand control, instruct the one of the plurality of loads to shift to the non-working state; and
   a notifying section configured to, when the notifying section has been inquired of by the inquiry section, notify the instructing section of a result of the determination by the determining section.

2. The electric power demand control device according to claim 1, wherein
   the generating section generates the total time length of the working state and the total time length of the non-working state based on (i) electric power consumed by the one of the plurality of loads in the working state and (ii) electric power consumed by the one of the plurality of loads in the non-working state.

3. The electric power demand control device according to claim 1, wherein
   the determining section determines to select the one of the plurality of loads as the target of the electric power demand control when the ratio is larger than the threshold.

4. A non-transitory computer-readable recording medium in which a program is stored, wherein the program is configured to cause a computer to function as the electric power demand control device according to claim 1.

5. An electric power demand control system, comprising:
a determining device; and
an instructing device,
the instructing device comprising a processor configured with a program to implement:
    a necessity determining section configured to determine whether electric power demand control is necessary for a facility in which a plurality of loads are installed;
    an inquiry section configured to, for each of the plurality of loads, when the necessity determining section has determined that the electric power demand control is necessary, inquire of the determining device whether one of the plurality of loads is selectable as a target of the electric power demand control; and
    an instructing section configured to, when the instructing section has received from the determining device a notification that the one of the plurality of loads is selected as the target of the electric power demand control, instruct the one of the plurality of loads to shift to a non-working state,
the determining device comprising a processor configured with a program to implement:
    a generating section configured to generate, for each of the plurality of loads, (i) a total time length of a working state of the one of the plurality of loads within a time period and (ii) a total time length of the non-working state of the one of the plurality of loads within the time period;
    a determining section configured to determine, based on a ratio of the total time length of the non-working state to the total time length of the working state and a threshold for the ratio, whether to select the one of the plurality of loads as the target of the electric power demand control; and
    a notifying section configured to, when the notifying section has been inquired of by the instructing device, notify the instructing device of a result of the determination by the determining section.

6. The electric power demand control system according to claim 5, wherein
the determining section determines to select the one of the plurality of loads as the target of the electric power demand control when the ratio is larger than the threshold.

7. The electric power demand control system according to claim 6, wherein
the instructing device further comprises a providing section configured to provide the determining device with the threshold for use by the determining device.

8. The electric power demand control system according to claim 7, wherein
the necessity determining section, when total electric power consumed at the facility within a time period is larger than a target electric power consumption, determines that the electric power demand control is necessary.

9. The electric power demand control system according to claim 7, wherein:
the processor is configured with the program to implement the necessity determining section such that:
the necessity determining section, after the instructing section has instructed the one of the plurality of loads to shift to the non-working state, determines again whether the electric power demand control is necessary; and
the providing section, when the necessity determining section has determined again that the electric power demand control is necessary, provides each of the plurality of loads with an updated threshold smaller than the threshold.

10. The electric power demand control system according to claim 5, wherein the processor is further configured with the program to implement:
an electric power consumption determining section configured to determine electric power consumed by the one of the plurality of loads after the one of the plurality of loads has shifted to the non-working state.

11. The electric power demand control system according to claim 5, wherein:
the one of the plurality of loads is connected to an other device that operates in conjunction with the one of the plurality of loads;
the one of the plurality of loads, after the one of the plurality of loads has been instructed to shift to the non-working state, shifts to the non-working state and notifies the other device that electric power consumed by the one of the plurality of loads has decreased; and
the other device shifts to the non-working state after the other device has been notified that the electric power consumed by the one of the plurality of loads has decreased.

12. The electric power demand control system according to claim 11, wherein
the other device is (i) an open-close valve for compressed air, (ii) a power supply device for an exhaust duct, (iii) a power supply device for air conditioning, or (iv) a control device for the air conditioning.

13. The electric power demand control system according to claim 5, wherein
the determining device is disposed in the one of the plurality of loads.

14. An electric power demand control method, comprising the steps of, for each load in a plurality of loads:
(a) determining whether electric power demand control is necessary for a facility in which the plurality of loads are installed;
(b) inquiring, for each of the plurality of loads, when it is determined by the step (a) that the electric power demand control is necessary, whether one of the plurality of loads is selectable as a target of the electric power demand control;
(c) generating (i) a total time length of a working state of one load of the plurality of loads within a time period and (ii) a total time length of a non-working state of the one load of the plurality of loads within the time period;
(d) determining, based on a ratio of the total time length of the non-working state to the total time length of the working state and a threshold for the ratio, whether to select the one load of the plurality of loads as a target of electric power demand control;
(c) when (e) upon receiving a notification that the step (d) has determined to select the one load of the plurality of loads as the target of the electric power demand control, instructing the one load of the plurality of loads to shift to the non-working state; and
(f) upon being inquired of by the step (b), notifying the step (e) of a result of the determination by the step (d).

* * * * *